United States Patent
Vignola et al.

(10) Patent No.: US 12,501,921 B2
(45) Date of Patent: Dec. 23, 2025

(54) METHOD FOR PRODUCING RICE WITH A LOW GLYCEMIC INDEX AND LOW GLYCEMIC LOAD

(71) Applicant: NEXT FOOD R&S S.R.L. UNIPERSONALE, Turin (IT)

(72) Inventors: Francesco Vignola, Vercelli (IT); Marcello Vignola, Vercelli (IT)

(73) Assignee: NEXT FOODS R&S S.R.L. UNIPERSONALE, Turin (IT)

( * ) Notice: Subject to any disclaimer, the term of this patent is extended or adjusted under 35 U.S.C. 154(b) by 759 days.

(21) Appl. No.: 17/793,268

(22) PCT Filed: Feb. 9, 2021

(86) PCT No.: PCT/IB2021/051026
§ 371 (c)(1),
(2) Date: Jul. 15, 2022

(87) PCT Pub. No.: WO2021/171116
PCT Pub. Date: Sep. 2, 2021

(65) Prior Publication Data
US 2023/0345978 A1   Nov. 2, 2023

(30) Foreign Application Priority Data
Feb. 26, 2020   (IT) .......... 102020000003979

(51) Int. Cl.
A23L 7/196   (2016.01)
A23B 2/90   (2025.01)
A23B 9/08   (2006.01)
A23L 5/10   (2016.01)
A23L 33/20   (2016.01)

(52) U.S. Cl.
CPC .......... *A23L 7/196* (2016.08); *A23B 2/90* (2025.01); *A23B 9/08* (2013.01); *A23L 5/13* (2016.08); *A23L 5/15* (2016.08); *A23L 33/20* (2016.08)

(58) Field of Classification Search
CPC . A23L 7/196; A23L 33/20; A23L 5/13; A23L 5/15; A23B 2/90; A23B 9/08
See application file for complete search history.

(56) References Cited

U.S. PATENT DOCUMENTS

2007/0196559 A1* 8/2007 Fukumori ............. A23L 33/175
                                                   426/618
2008/0286435 A1* 11/2008 Fukumori ............. A23L 11/01
                                                   426/634

FOREIGN PATENT DOCUMENTS

EP       0736260 A1      10/1996
KR    20090045637 A       5/2009
KR      101648168 B1      8/2016

OTHER PUBLICATIONS

Huang, CN 106490463 A, 2017, Derwent Abstract. (Year: 2017).*
Yulianto, ID 201805056 A, 2018, Derwent Abstract. (Year: 2018).*
Choi, KR 2016033871 A, 2016, Derwent Abstract. (Year: 2016).*
Pratiwi, "Comparative study on resistant starch, amilose content and glycaemic index after precooked process in white rice", IOP Conf. Series: Earth and Environmental Science, 131, 2018. (Year: 2018).*
Yadav et al., "Studies on effect of multiple heating/cooling cycles on the resistant starch formation in cereals, legumes and tubers", International Journal of Food Sciences and Nutrition, 60(S4): 258-272, Sep. 2009. (Year: 2009).*
International Search Report and Written Opinion dated May 26, 2021 from counterpart International Patent Application No. PCT/IB2020/051026.

* cited by examiner

*Primary Examiner* — Stephanie A Kohler
(74) *Attorney, Agent, or Firm* — SHUTTLEWORTH & INGERSOLL, PLC; Timothy J. Klima

(57) ABSTRACT

A method for producing rice with a low glycemic index and a low glycemic load includes, in sequence, preparing husked brown rice, humidifying the rice with water at room temperature until reaching a moisture content equal to 18-22%, resting the rice for 24-60 minutes, heating the rice to a temperature of 80-85° C., cooling the rice in an environment at a temperature lower than the room temperature until the rice reaches a temperature of 10° C., reconstituting the rice for 24-72 hours, maintaining the moisture content, until the rice reaches the room temperature, heating the rice again until the rice externally reaches a temperature of 60-65° C., corresponding to an internal temperature greater than 70° C., cooling the rice to reach the room temperature, refining the rice having a moisture content equal to 18-22% and drying until reaching a moisture content equal to 12-13%.

11 Claims, No Drawings

METHOD FOR PRODUCING RICE WITH A LOW GLYCEMIC INDEX AND LOW GLYCEMIC LOAD

This application is the National Phase of International Application PCT/IB2021/051026 filed Feb. 9, 2021 which designated the U.S.

This application claims priority to Italian Patent Application No. 102020000003979 filed Feb. 26, 2020, which application is incorporated by reference herein.

The present invention relates to a method for producing rice with a low glycaemic index and a low glycaemic load.

The values of the glycaemic index GI represent a classification system used to classify the glycaemic potential of foods. In particular, using a scale from 0 to 100 (glucose=100), the glycaemic index measures the speed of digestion and absorption of foods containing carbohydrates and their effect on glycaemia, that is, on blood glucose levels.

White rice is generally considered a food with a high glycaemic index (GI), with values of GI comprised between 65 and 94. The high glycaemic index of white rice is associated with a greater risk of type 2 diabetes, in particular in Asian populations. It has been estimated that the daily consumption of white rice is associated with an 11% increase in the risk of diabetes in the population.

It has been noted that so-called "parboiled" rice has a reduced carbohydrate content, in addition to having 80% of the nutrients of brown rice, but its hard, tough consistency makes it unappealing in particular to Asian populations and poorly suited to many uses.

Thus, at present there is a particularly felt need to be able to provide a rice with a low glycaemic index and a low glycaemic load and a corresponding reliable and repeatable production method.

In this context, the technical task at the basis of the present invention is to propose a method for producing rice with a low glycaemic index and a low glycaemic load that enables this need to be satisfied.

In particular, it is an object of the present invention to provide a method for producing rice with a low glycaemic index and a low glycaemic load which is reliable and repeatable.

The stated technical task and the specified objects are substantially achieved by a method for producing rice with a low glycaemic index and a low glycaemic load, comprising the technical features disclosed in one or more of the accompanying claims.

In particular, the present invention relates to a method for producing rice with a low glycaemic index and a low glycaemic load from husked brown rice.

Initially, the rice is humidified until reaching a moisture content equal to 18-22%. After a resting step, the rice undergoes a first heating, a rapid cooling, a reconstituting step and a second heating.

When the rice returns to room temperature it is refined to the desired degree: brown, semi-milled or white.

The two heating steps are carried out in MW or RF apparatus, preferably for about 3 minutes. MW (microwave) means frequencies comprised between 300 MHz and 300 GHz and in particular frequencies of 915 MHZ (USA) or 2.45 GHZ (Italy and the EU) are used. RF (radiofrequency) means frequencies of less than 300 MHz and in particular use is made of frequencies of 27.12 MHz in Italy and the EU, or 40.68 MHz in the USA.

In this manner one generates a high percentage of resistant starch RS3, which, besides reducing the glycaemic index and the glycaemic load of the rice, acts as a probiotic and favours gut health in humans.

Resistant starch RS3 functions as a soluble, fermentable fibre; it passes undigested through the stomach and the small intestine and enters the large intestine, eventually reaching the colon, where it performs a nutritional function for bacterial flora. This type of starch is not completely decomposed and absorbed, but is rather transformed into short-chain fatty acid by intestinal bacteria.

Starch is made up of amylose and amylopectin; amylose is made up of long linear chains of glucose in the form of helices, while amylopectin has a branched structure. The two molecules form granules that are insoluble in water at room temperature and not attackable by digestive enzymes.

During gelatinisation, the amylose and amylopectin chains are reorganised; part of the water included in the structure is eliminated and the starch loses its regular structure and becomes attackable by digestive enzymes. When gelatinised starch cools, it tends to return to a configuration similar to the initial one and this phenomenon is called "starch retrogradation".

Retrogradation is a reversible process and the starch gelatinises again when reheated.

Resistant starch RS3 is retrograded. The physical and chemical properties, in particular the reduced capacity to retain water, render resistant starch RS3 a functional ingredient that has been demonstrated to be beneficial for health and allows a reduction in the glycaemic response in diabetics and an increase in insulin sensitivity in healthy individuals and insulin-resistant individuals with type II diabetes and improves first-phase insulin secretion if administered to overweight insulin-resistant adults.

The method according to the invention envisages heating the core of kernels so as to gelatinise only the centre of the grains, thanks to the fact that the moisture content is maintained lower than the value required to have a complete gelation (theoretical value 24%-effective value 30-34%) and thanks to the fact that with MW or RF heat is generated from the inside and the heating is controlled in such a way as not to extend the gelatinisation to the whole grain.

The two steps of heating at a temperature of less than 90° C., with a rapid cooling in between, prevent, among other things, the rice from undergoing a Maillard reaction, so the natural flavour and aroma of the rice is not modified.

The first rapid cooling and the second slower cooling cause the retrogradation of the gelatinised starch, which thus becomes more resistant to digestion. In particular, the first rapid cooling leads to a drastic reduction in temperature to 10° C., enabling the first retrogradation of the starch to be quickly obtained.

The appearance of the rice obtained is natural, the colour becomes slightly creamy and the hardness and consistency increase without changing the other parameters, like a natural aged rice. The GI value of white, semi-milled and brown rice falls below 40 and the products are suitable for consumption by diabetics. Similarly, the value of the glycaemic load is also reduced.

The double heating and rapid cooling after the first heating with retrogradation of the starch, followed by further heating and cooling with a long rest enable a low level of the glycaemic index to be obtained.

The present invention can comprise one or more of the features indicated in the dependent claims, incorporated herein by reference, each corresponding to a possible embodiment.

Additional features and advantages of the present invention will become more apparent from the approximate, and thus non-limiting, description of a preferred but not exclusive embodiment of a method for producing rice with a low glycaemic index and a low glycaemic load which also comprises the features indicated above.

In accordance with the present invention, a description is provided below of a method for producing rice with a low glycaemic index and a low glycaemic load from husked brown rice, i.e. rice previously subjected to husking to eliminate the chaff. By using husked brown rice it is possible to prevent the grains from becoming glued together. In fact, the starch is beneath the outer layer of the grain where fats and proteins are present; therefore, the starch grains do not open and do not stick together. Refinement is thus advantageously deferred to the end of the heating/cooling steps. The husked brown rice is subjected to a step of humidifying with water at room temperature until reaching a moisture content equal to 18-22%.

The step of humidifying the husked brown rice preferably comprises spraying the husked brown rice with water at room temperature. Humidifying by spraying is preferable to conventional soaking, because the water content in each grain is more uniform and adjustment is easier. The rice is preferably moved by means of a screw conveyor, for example equipped with an inverter, so as to be easily adjustable. Furthermore, as soon as the moisture content is reached it is possible interrupt the humidifying step by interrupting the spray of water.

It is preferably envisaged to progressively draw a sample of husked brown rice during the humidifying step and measure the moisture thereof in order to interrupt the humidifying step when the moisture content is equal to 18-22%.

The measurement of the moisture content can be obtained with instruments that operate by drying the sample for 10 minutes, for example by means of a Buhler oven.

After the humidifying step, there is envisaged a step of resting the husked brown rice for 24-60 minutes, preferably keeping the rice in movement, for example by means of screw conveyors and/or conveyor belts so as to allow the moisture to penetrate to the core and keep the product moving to prevent it from becoming packed.

After the resting step, there is envisaged a first heating step comprising heating the husked brown rice until the husked brown rice reaches a temperature of 80-85° C.

The first heating step is preferably carried out in a radiofrequency RF or microwave MW apparatus at the frequencies indicated above.

On reaching a temperature of 80-85° C. (higher than the gelatinisation temperature, which is generally situated at around 70° C.), the rice core gelatinises.

The first heating step has a duration of about 3 minutes. In the case of RF the powers vary from 1 to 10 kw per emitter and preferably 8 10 kw emitters are used. The flow rate is preferably 2.5 tons per hour (t/h). In the case of MW the powers are 1.5 Kw per emitter and 54 emitters will be used. The flow rate is preferably 2.5 tons per hour (t/h).

After the first heating step, there is envisaged a first step of cooling the husked brown rice in an environment at a temperature lower than the room temperature until the husked brown rice reaches a value of 10° C. The first cooling step is carried out quickly, preferably at a maximum ambient temperature of 4° C., for example in a cooling apparatus operating with water at a maximum temperature of 4° C.

When the temperature of 10° C. is reached, retrogradation is accelerated.

After the first cooling step, there is envisaged a step of reconstituting of the husked brown rice for 24-72 hours, maintaining the moisture content, until the husked brown rice reaches the room temperature. The reconstituting step is preferably carried out in a controlled environment, for example in a column dryer by blowing air at a temperature greater than that of the husked brown rice. Even more preferably, it is envisaged to maintain the difference between the air temperature and the temperature of the husked brown rice constant, preferably equal to about 3° C., by progressively increasing the air temperature as the temperature of the husked brown rice increases. In this case it is advantageous to measure the temperature of the husked brown rice, preferably with probes.

After the reconstituting step, there is envisaged a second heating step comprising heating the husked brown rice until the husked brown rice externally reaches a temperature of 60-65° C., corresponding to an internal temperature greater than 70° C., which enables gelatinisation.

The second heating step is preferably carried out in a radiofrequency RF or microwave MW apparatus, preferably for at least three minutes.

The second heating step allows a second gelation of the starch to be obtained at the core of the grain and a subsequent retrogradation, with an increase in resistant starch RS3.

After the second heating step, there is envisaged a second cooling step until the husked brown rice reaches the room temperature and, subsequently, a step of refining the husked brown rice, which still has a moisture content equal to 18-22%.

The refining step comprises at least one pass through a refiner, selecting the number of passes for selecting the percentage of bran and germ removed so as to obtain, selectively, brown rice, semi-milled rice or white rice.

With a single pass one removes 3% at most of the flour, thus obtaining brown rice. By increasing the number of passes in the refiner, one obtains semi-milled rice and white rice.

The minimum moisture content of 18% allows avoiding breakage during refinement, as the grains are flexible.

After the refining step, there is envisaged a drying step until reaching a moisture content equal to 12-13%.

The drying step is preferably carried out in a column dryer by circulating air at about 45° C. for about 3 hours.

A rice obtained with the method of the present invention was subjected to an analysis of the glycaemic index (GI) according to the in vitro Englyst method cited in the article "A shift toward a new holistic paradigm will help to preserve and better process grain products' food structure for improving their health effects"-Food Function, 2015, 6, 363, which characterises and quantifies the glycaemic response after consumption of different types of carbohydrates. The GI measures the evolution of the glycaemic response after consumption of a test food with reference to glucose.

In the case of a rice obtained with the method of the present invention, the in vitro GI shows to be 54.4.

In accordance with the aforesaid publication, this value is lower than 55, which corresponds to the maximum limit for a low-GI rice.

The invention claimed is:
1. A method for producing rice with a low glycemic index and a low glycemic load, comprising:
   a step of preparing husked brown rice;
   a step of humidifying the husked brown rice with water at room temperature until reaching a moisture content equal to 18-22%;
   after the humidifying step, a step of resting the husked brown rice for 24-60 minutes;

after the resting step, a first heating step comprising heating the husked brown rice until the brown rice reaches a temperature of 80-85° C.;

after the first heating step, a first step of cooling the husked brown rice in an environment at a temperature lower than the room temperature until the brown rice reaches a temperature of 10° C.;

after the cooling step, a step of reconstituting the husked brown rice for 24-72 hours, maintaining the moisture content of the husked brown rice, until the husked brown rice reaches the room temperature;

after the reconstituting step, a second heating step comprising heating the husked brown rice until the husked brown rice externally reaches a temperature of 60-65° C., corresponding to an internal temperature greater than 70° C.;

after the second heating step, a second cooling step until the husked brown rice reaches the room temperature;

after the second cooling step, a step of refining the husked brown rice having a moisture content equal to 18-22%;

after the refining step, a drying step until reaching a moisture content equal to 12-13%.

2. The method for producing rice according to claim 1, wherein the humidifying step comprises spraying the brown rice with water at room temperature.

3. The method for producing rice according to claim 1, and further comprising the steps of:

progressively collecting a sample of husked brown rice during the humidifying step;

measuring the moisture content of the collected sample;

interrupting the humidifying step when the moisture content is equal to 18-22%.

4. The method for producing rice according to claim 1, wherein the first heating step and/or the second heating step is carried out in an RF or MW apparatus.

5. The method for producing rice according to claim 1, wherein the cooling step is carried out in a cooling apparatus operating with water at a maximum temperature of 4° C.

6. The method for producing rice according to claim 1, wherein the reconstituting step is carried out in a controlled environment, in a column dryer by blowing air at a temperature greater than that of the husked brown rice.

7. The method for producing rice according to claim 6, wherein the reconstituting step comprises maintaining a difference between the temperature of the air and the temperature of the husked brown rice constant, equal to about 3° C., by progressively increasing the temperature of the air as the temperature of the husked brown rice increases.

8. The method for producing rice according to claim 7, wherein the reconstituting step comprises measuring the temperature of the husked brown rice, with probes.

9. The method for producing rice according to claim 1, wherein the refining step comprises at least one pass through a refiner, wherein the number of passes are selected according to a percentage of bran and germ to be removed to obtain, selectively, brown rice, semi-milled rice or white rice.

10. The method for producing rice according to claim 1, wherein the drying step is carried out in a column dryer with air circulation at about 45° C. for about 3 hours.

11. The method for producing rice according to claim 1, wherein the resting step comprises moving the brown rice by means of screw conveyors and/or conveyor belts.

* * * * *